United States Patent
Okazaki et al.

(10) Patent No.: US 7,619,829 B2
(45) Date of Patent: Nov. 17, 2009

(54) IMMERSION OBJECTIVE LENS, FLUOROMETRIC ANALYZER, AND INVERTED MICROSCOPE

(75) Inventors: Kenya Okazaki, Hachioji (JP); Mitsuo Harada, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/481,513

(22) Filed: Jul. 6, 2006

(65) Prior Publication Data

US 2006/0274424 A1    Dec. 7, 2006

Related U.S. Application Data

(63) Continuation of application No. PCT/JP2005/000040, filed on Jan. 5, 2005.

(30) Foreign Application Priority Data

Jan. 6, 2004    (JP) .............................. 2004-001201

(51) Int. Cl.
   G02B 21/02    (2006.01)
   G02B 21/34    (2006.01)
(52) U.S. Cl. .................... 359/656; 359/368; 359/398
(58) Field of Classification Search ......... 359/368–390, 359/651–661, 808–830
   See application file for complete search history.

(56) References Cited

U.S. PATENT DOCUMENTS

| 3,837,731 | A | * | 9/1974 | Amos et al. ................... 359/656 |
| 4,480,910 | A | * | 11/1984 | Takanashi et al. ............. 355/30 |
| 6,980,293 | B1 | * | 12/2005 | Harada ........................ 356/317 |
| 7,091,502 | B2 | * | 8/2006 | Gau et al. ................. 250/492.2 |

FOREIGN PATENT DOCUMENTS

| JP | 5-60981 | | 3/1993 | |
| JP | 6-208058 | * | 7/1994 | ................. 359/368 |
| JP | 7-77657 | | 3/1995 | |
| JP | 2005-62687 | * | 3/2005 | ................. 359/368 |
| WO | WO 02/093232 | * | 11/2002 | ................. 359/368 |

OTHER PUBLICATIONS

English translation of Japanese reference No. 6-208058.*

* cited by examiner

Primary Examiner—Thong Nguyen
(74) Attorney, Agent, or Firm—Scully, Scott, Murphy & Presser, P.C.

(57) ABSTRACT

An immersion objective lens includes a front lens, a lens frame which supports the front lens, and a liquid preventive frame which is attached around the lens frame. The liquid preventive frame includes a liquid bulb holding wall which holds a liquid supplied onto the front lens. A distal end of the liquid bulb holding wall is located more inner in the front lens in a direction parallel to a center axis of the front lens than a distal end face of the front lens.

11 Claims, 8 Drawing Sheets

IMMERSION OBJECTIVE LENS, FLUOROMETRIC ANALYZER, AND INVERTED MICROSCOPE

CROSS-REFERENCE TO RELATED APPLICATIONS

This is a Continuation Application of PCT Application No. PCT/JP2005/000040, filed Jan. 5, 2005, which was published under PCT Article 21(2) in Japanese.

This application is based upon and claims the benefit of priority from prior Japanese Patent Application No. 2004-001201, filed Jan. 6, 2004, the entire contents of which are incorporated herein by reference.

BACKGROUND OF THE INVENTION

1. Field of the Invention

The present invention relates to an immersion objective lens. The present invention also relates to an inverted microscope comprising an immersion objective lens, and an optical analyzer including such an inverted microscope.

2. Description of the Related Art

Japanese Pat. Appln. KOKAI Publication No. 5-60981 discloses an immersion objective lens which comprises a recessed liquid holding portion around a front lens. In this immersion objective lens, the liquid holding portion is formed between a lens barrel and an annular waterproof member which is fixed around the lens barrel.

Japanese Pat. Appln. KOKAI Publication No. 7-77657 discloses a liquid immersion device comprising an elastic container which contains a liquid and a holder which holds the elastic container. The holder has an operation hole for pressing the elastic container through it. The liquid immersion device is detachably mounted on a revolver in the same manner as an objective lens.

BRIEF SUMMARY OF THE INVENTION

The present invention is directed to an immersion objective lens. An immersion objective lens according to the present invention comprises a front lens, a lens frame which supports the front lens, and a liquid preventive frame which is attached around the lens frame. The liquid preventive frame includes a liquid bulb holding wall which holds a liquid supplied onto the front lens. A distal end of the liquid bulb holding wall is located more inner in the front lens in a direction parallel to a center axis of the front lens than a distal end face of the front lens.

The present invention is also directed to an optical analyzer. An optical analyzer according to the present invention comprises a light source to irradiate a specimen with light, an inverted microscope, a photoelectrical signal converter which converts light obtained by the inverted microscope into an electrical signal, and a data processor which obtains various types of characteristics of the specimen on the basis of the electrical signal which has been converted by the photoelectrical signal converter. The inverted microscope includes an immersion objective lens and a liquid supply device which supplies a liquid onto the immersion objective lens. The immersion objective lens includes a front lens, a lens frame which supports the front lens, and a liquid preventive frame which is attached around the lens frame. The liquid preventive frame includes a liquid bulb holding wall which holds the liquid supplied onto the front lens. A distal end of the liquid bulb holding wall is located more inner in the front lens in a direction parallel to a center axis of the front lens than a distal end face of the front lens.

The present invention is also directed to an inverted microscope. An inverted microscope according to the present invention comprises an immersion objective lens and a liquid supply device which supplies a liquid onto the immersion objective lens. The immersion objective lens includes a front lens, a lens frame which supports the front lens, and a liquid preventive frame which is attached around the lens frame. The liquid preventive frame includes a liquid bulb holding wall which holds the liquid supplied onto the front lens. A distal end of the liquid bulb holding wall is located more inner in the front lens in a direction parallel to a center axis of the front lens than a distal end face of the front lens.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described with reference to the accompanying drawings.

First Embodiment

Figure 2:
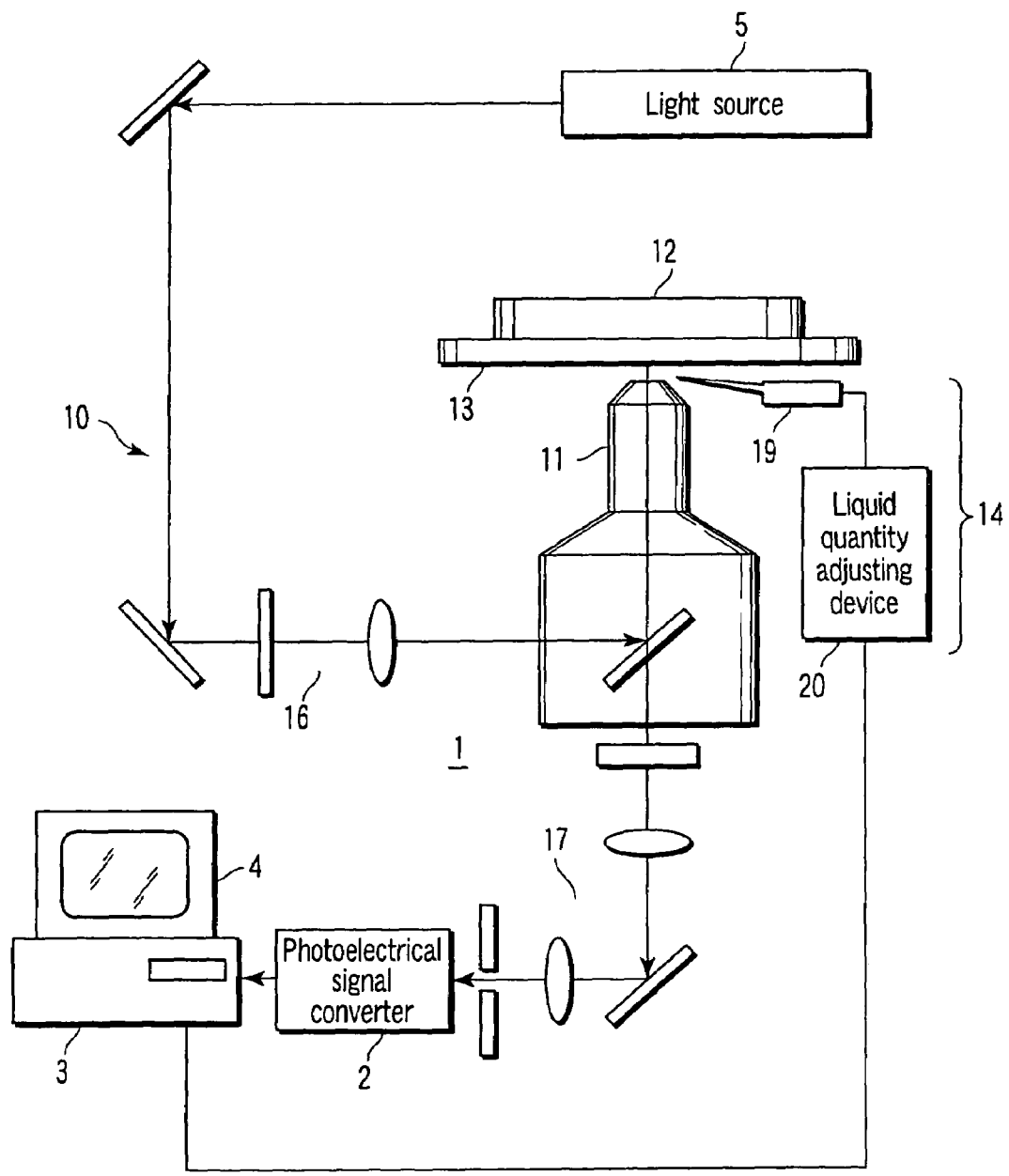
FIG. 2 schematically shows the arrangement of the fluorometric analyzer according to the first embodiment of the present invention.

This embodiment is directed to a fluorometric analyzer. FIG. 2 schematically shows the arrangement of a fluorometric analyzer according to the first embodiment of the present invention.

As shown in FIG. 2, a fluorometric analyzer 10 comprises a light source 5, an inverted fluorescence microscope 1 which uses a confocal optical system, a photoelectrical signal converter 2 which acquires fluorescence emitted by a sample labeled with fluorescence and converts it into an electrical signal, a data processor 3 which obtains the characteristics of a sample (not shown) on the basis of measurement data obtained by the photoelectrical signal converter 2, and a display 4 which displays the various types of characteristics of the sample obtained by the data processor 3. The fluorometric analyzer 10 also has a controller 6 (see FIG. 4) which controls the units described above.

The light source 5 comprises, e.g., a laser beam generator, although not limited to it. The photoelectrical signal converter 2 comprises, e.g., a photomultiplier or avalanche diode, although is not limited to them.

The inverted fluorescence microscope 1 has an immersion objective lens 11, a stage 13 which supports a sample plate 12, a liquid supply device 14 which supplies a liquid to between the immersion objective lens 11 and sample plate 12, a light channel 16 which guides light generated by the light source 5 to the immersion objective lens 11, and a light channel 17 which guides light obtained by the immersion objective lens 11 to the photoelectrical signal converter 2.

The liquid supply device 14 has a supply nozzle 19 for supplying a liquid to between the sample plate 12 and immersion objective lens 11 and a liquid quantity adjusting device 20 which adjusts the quantity of liquid to be supplied from the supply nozzle 19. The supply nozzle 19 and liquid quantity adjusting device 20 are in fluid connection with each other.

The sample plate 12 is supported by the stage 13 and arranged above the immersion objective lens 11. The supply nozzle 19 for supplying the liquid is arranged near the immersion objective lens 11. The liquid to be supplied from the supply nozzle 19 includes, for example, a solution having the refractive index adjusted by some agent, water, etc., and preferably have appropriate surface tension and do not contain an impurity that scatters light. The sample plate 12 includes, for example, a plate where the sample is to be placed flat, a microplate which has a plurality of recesses to accommodate samples, etc., and preferably transmits light from the light source 5 well.

Figure 1:
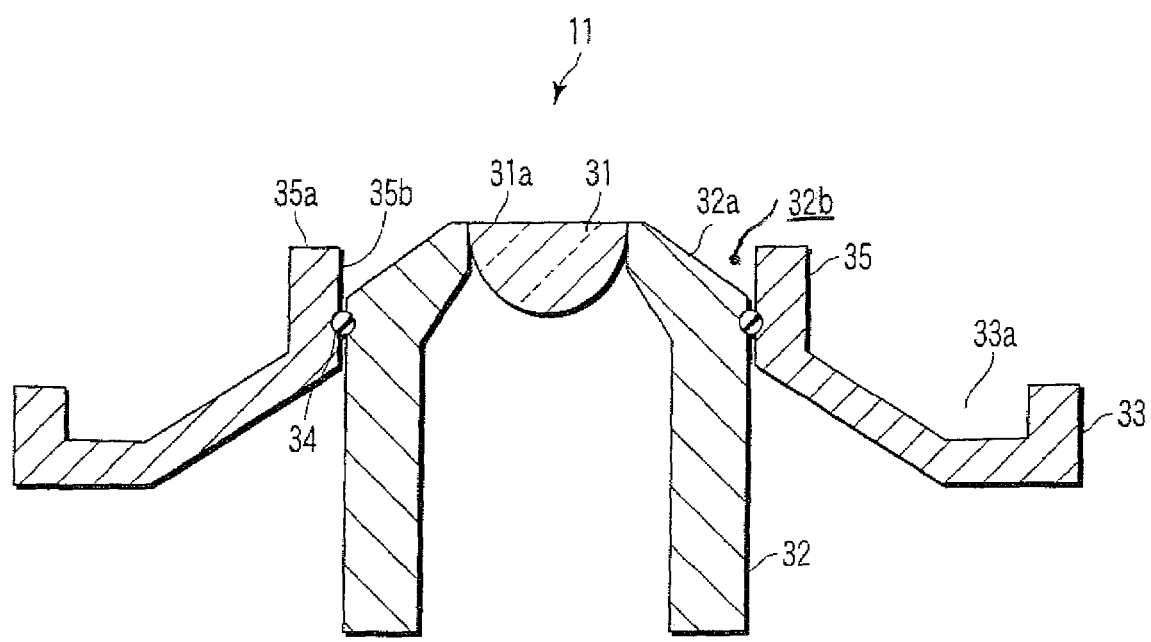
FIG. 1 shows a longitudinal section of an immersion objective lens in a fluorometric analyzer according to the first embodiment of the present invention.

FIG. 1 shows a longitudinal section of the immersion objective lens shown in FIG. 2. As shown in FIG. 1, the immersion objective lens 11 has a front lens 31, a lens frame 32 which supports the front lens 31, and a liquid preventive frame 33 which is attached around the lens frame 32. The lens frame 32 has a curved surface 32a like a side surface of a frustum of circular cone which declines in the radial direction. The liquid preventive frame 33 is for preventing the liquid supplied onto the front lens 31 from flowing into the details of the immersion objective lens 11 or into a device under the immersion objective lens 11. The liquid preventive frame 33 has a liquid bulb holding wall 35 on its inner side (a side closest to the center axis of the lens) and a liquid receiving portion 33a on its outer side. An O-ring 34 is attached between the lens frame 32 and liquid preventive frame 33. The O-ring 34 prevents the liquid from moving from the gap between the lens frame 32 and liquid preventive frame 33 into the details of the immersion objective lens 11. The distal end 35a of the liquid bulb holding wall 35 is located in front of an outer circumference of the curved surface 32a of the lens frame 32, so that an inner side surface of the liquid bulb holding wall 35 and the curved surface 32a of the lens frame 32 form a recess 32b.

Figure 3:
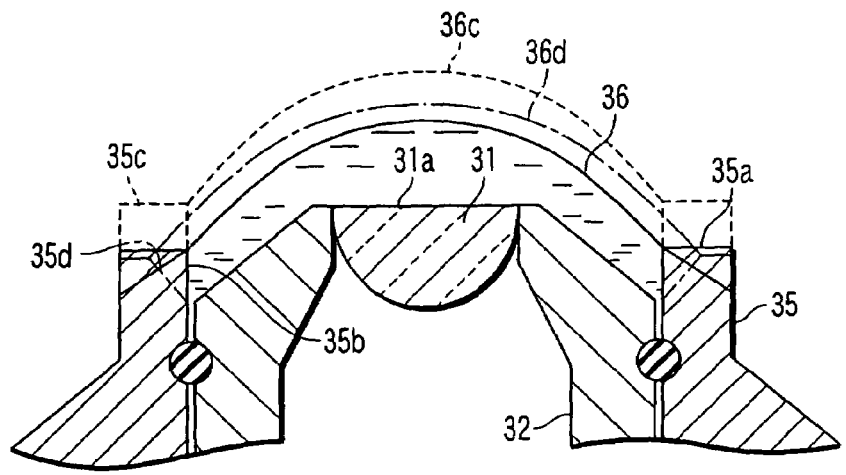
FIG. 3 shows a liquid bulb which is formed on the liquid bulb holding wall of the immersion objective lens shown in FIG. 1.

As shown in FIG. 3, a distal end 35a of the liquid bulb holding wall 35 is located more inner in the immersion objective lens 11 in a direction parallel to the center axis of the front lens 31 than a distal end face 31a of the front lens 31. In other words, the distal end 35a of the liquid bulb holding wall 35 is located behind the distal end face 31a of the front lens 31 along the center axis of the front lens 31. More specifically, when the immersion objective lens 11 is set so that the front lens 31 comes to the upper side and the center axis of the front lens 31 extends in the vertical direction, the distal end 35a of the liquid bulb holding wall 35 is at a position lower than the distal end face 31a of the front lens 31.

The volume of a liquid bulb 36 formed by supplying the liquid inside the liquid bulb holding wall 35 is smaller than that of a liquid bulb 36c formed by supplying the liquid inside a liquid bulb holding wall with a distal end 35c which is located on the same plane as the distal end face 31a of the front lens 31. Thus, the liquid bulb 36 is held stably. In other words, the immersion objective lens 11 can stably hold the liquid bulb 36. Particularly, the distal end of the liquid bulb holding wall 35 is preferably at a position lower than the distal end face 31a of the front lens 31 by 0.5 mm.

Furthermore, it is more preferable if a side surface 35b on the inner side of the liquid bulb holding wall 35 is parallel to the vertical direction. The volume of the liquid bulb 36 formed by the liquid bulb holding wall 35 having such a vertical side surface 35b is smaller than that of a liquid bulb 36d which is formed by a liquid bulb holding wall having an inclined side surface 35d. Thus, the liquid bulb is held more stably. Namely, such an immersion objective lens 11 can hold the liquid bulb 36 stably.

Figure 4:
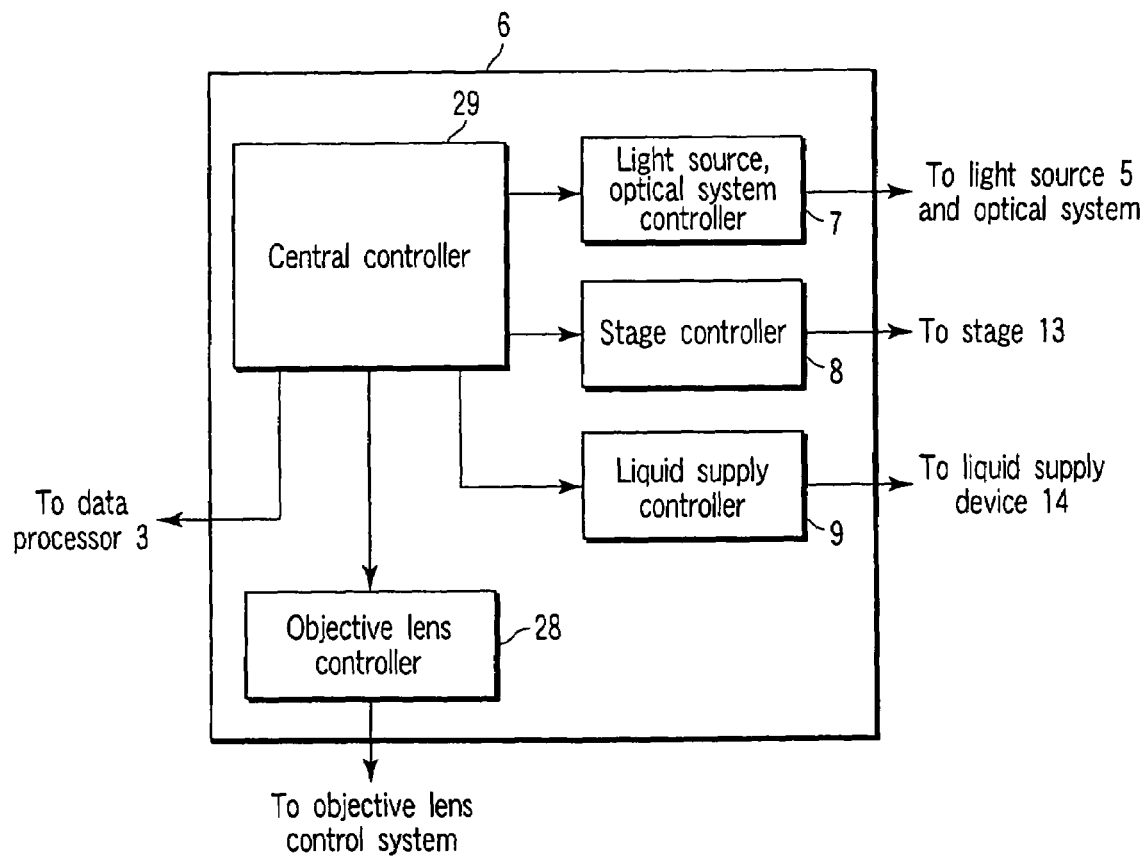
FIG. 4 shows the controller of the fluorometric analyzer shown in FIG. 2.

FIG. 4 shows the controller 6 of the fluorometric analyzer 10 shown in FIG. 2. As shown in FIG. 4, the controller 6 has a light source, optical system controller 7 which controls the light source 5 and the optical systems of the light channels 16 and 17, a stage controller 8 which controls the movement of the stage 13, a liquid supply controller 9 which controls the liquid supply device 14, an objective lens controller 28 which controls the movement and focusing of the immersion objective lens 11, and a central controller 29 which supplies instructions to the respective controllers 7, 8, 9, and 28 in accordance with the predetermined operation procedure (see FIG. 5) of the fluorometric analyzer 10.

Figure 5:
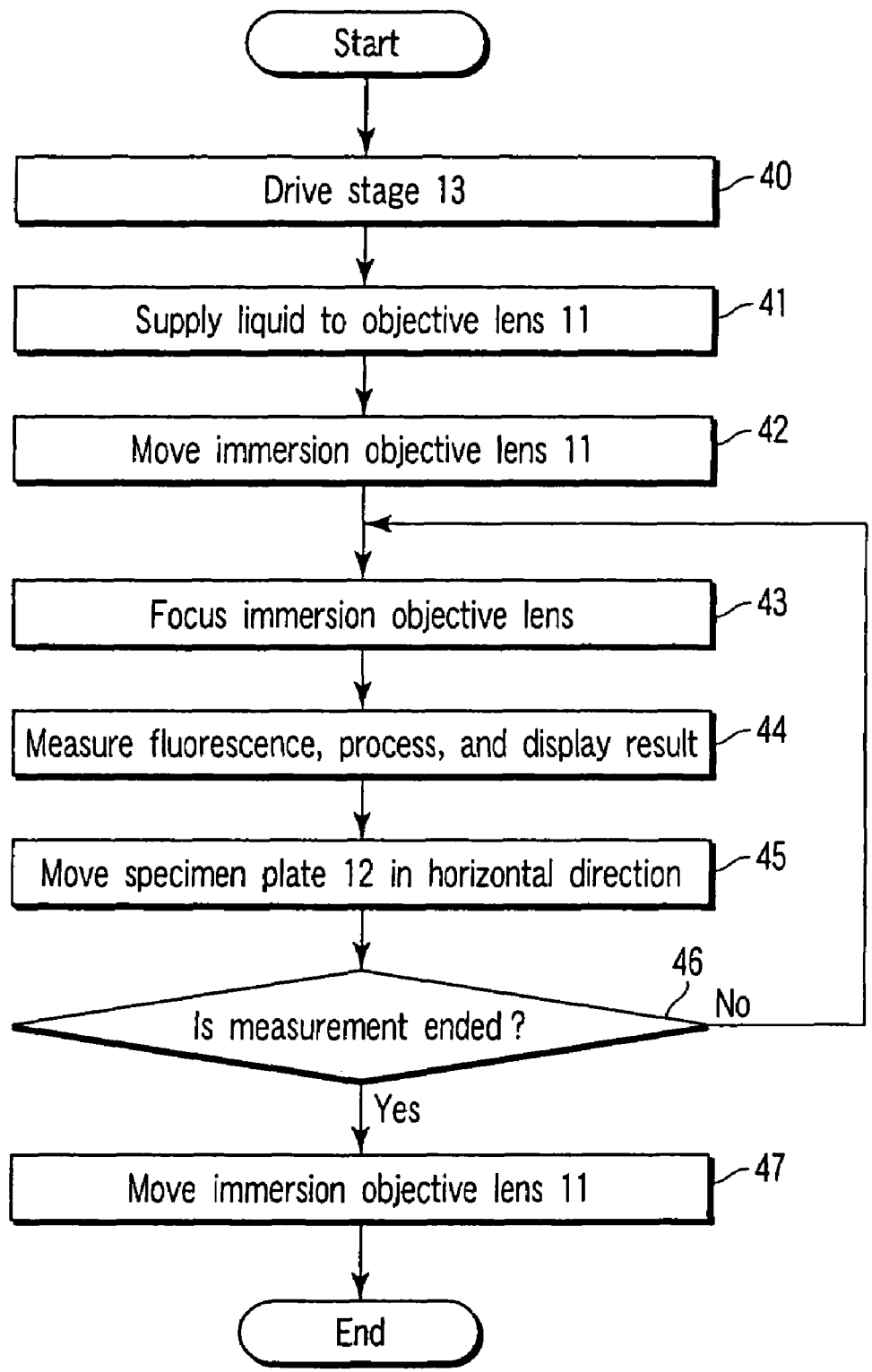
FIG. 5 shows the flow of the operation procedure of the fluorometric analyzer shown in FIG. 2.

FIG. 5 shows the flow of the operation procedure of the fluorometric analyzer 10 shown in FIG. 2. The operation procedure of the fluorometric analyzer 10 will be described with reference to FIG. 5.

When the sample plate 12 is set on the stage 13, the controller 6 instructs the stage controller 8 to move the stage 13 to a predetermined position. In response to the instruction, the stage controller 8 drives the stage 13 (step 40).

Before measurement, the central controller 29 instructs the liquid supply controller 9 to supply the liquid to between the immersion objective lens 11 and sample plate 12. In response to the instruction, the liquid supply controller 9 drives the liquid quantity adjusting device 20 to supply a predetermined quantity of liquid inside the liquid bulb holding wall 35 (step 41).

As a result, the liquid bulb 36 is formed on the immersion objective lens 11. The liquid bulb 36 is stably held by the immersion objective lens 11. Thus, the flow can advance to the next step without replenishing or supplying again the liquid inside the liquid bulb holding wall 35. When supplying the liquid inside the liquid bulb holding wall 35 (step 41), assume that the liquid is supplied in a larger quantity than the quantity allowed by the liquid bulb holding wall 35. The liquid in a quantity that cannot be completely held by the liquid bulb holding wall 35 may move to the liquid receiving portion 33a outside the liquid bulb holding wall 35, but the liquid bulb 36 with an appropriate quantity is stably formed on the immersion objective lens 11. Therefore, the supply quantity of the liquid need not be adjusted strictly, so that the operation of the fluorometric analyzer can be controlled easily.

The central controller 29 instructs the objective lens controller 28 to move and focus the immersion objective lens 11, and the light source, optical system controller 7 to supply light. In response to the instruction, the objective lens controller 28 moves the immersion objective lens 11 close to the sample plate 12 (moves it upward on the surface of the sheet of drawing of FIG. 2) (step 42). When the light source, optical system controller 7 supplies a laser beam to the light source 5 for a predetermined period of time, the objective lens controller 28 performs focusing simultaneously (step 43).

Figure 6:
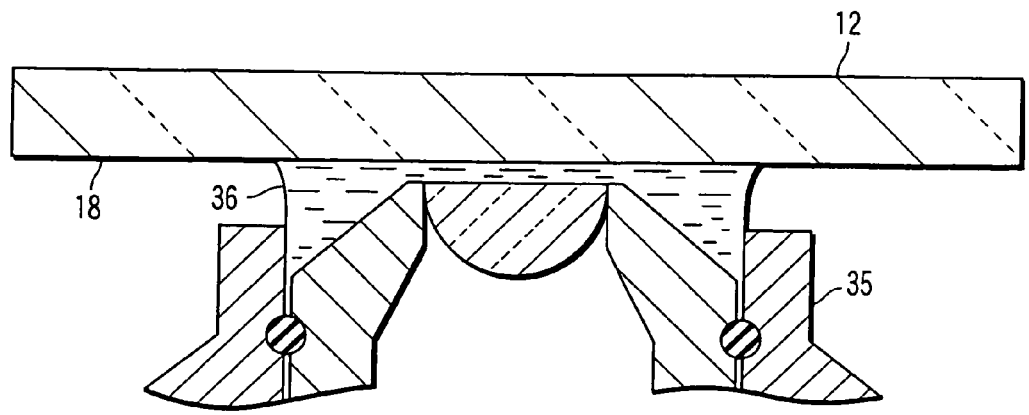
FIG. 6 shows the immersion objective lens, a specimen plate, and a liquid held between them in enlargement.

When moving the immersion objective lens 11 close to the sample plate 12 (step 42), the liquid is squeezed from the liquid bulb 36 outside the liquid bulb holding wall 35. As the liquid bulb holding wall 35 stably holds the liquid bulb 36, the gap between the immersion objective lens 11 and a bottom surface 18 of the sample plate 12 is kept filled with a sufficient liquid, as shown in FIG. 6.

Therefore, light irradiation to the sample and fluorescence measurement can be performed immediately without replenishing the liquid inside the liquid bulb holding wall 35. As the gap between the immersion objective lens 11 and sample plate 12 is filled with the liquid, the immersion objective lens 11 can be focused highly accurately. Thus, the sample can be irradiated at the focal point with light efficiently. As fluorescence that enters the immersion objective lens 11 is not lost between the immersion objective lens 11 and sample plate 12, the photoelectrical signal converter 2 can obtain highly accurate fluorescence measurement data.

The central controller 29 then instructs the data processor 3 to start data processing. In response to the instruction, the data processor 3 processes data (step 44).

The central controller 29 then instructs the stage controller 8 to move the sample plate 12 to the next measurement position. In response to the instruction, the stage controller 8 moves the sample plate 12 in the horizontal direction (step 45).

When the sample plate 12 is to be moved in the horizontal direction, the liquid does not flow out because it is stably held by the liquid bulb holding wall 35. Therefore, next optical analysis can be started immediately without replenishing the liquid bulb holding wall 35 with the liquid.

The central controller 29 instructs the objective lens controller 28 to focus the immersion objective lens 11 again. In response to the instruction, the objective lens controller 28 performs focusing (step 43). Movement of the sample plate 12, focusing, and measurement are repeated until measurement at the scheduled position is ended (step 46).

When measurement at the scheduled position is ended, the central controller 29 instructs the objective lens controller 28 to move the immersion objective lens 11 away from the sample plate 12. In response to the instruction, the objective lens controller 28 moves the immersion objective lens 11 away from the sample plate 12 (to move it downward on the sheet of drawing of FIG. 2) (step 47).

After that, the measured sample plate 12 is removed from the stage 13 by the operator.

According to the fluorometric analyzer 10 of the present embodiment, the liquid bulb 36 is stably held on the front lens 31. Even when the sample plate 12 is moved in the horizontal direction, the liquid does not flow out from between the immersion objective lens 11 and sample plate 12. Hence, the liquid need not be replenished or supplied again inside the liquid bulb holding wall 35, so that optical analysis can be performed quickly. Also, the immersion objective lens 11 can be focused highly accurately. This enables light irradiation of the sample at the focal point efficiently.

Second Embodiment

Figure 7:
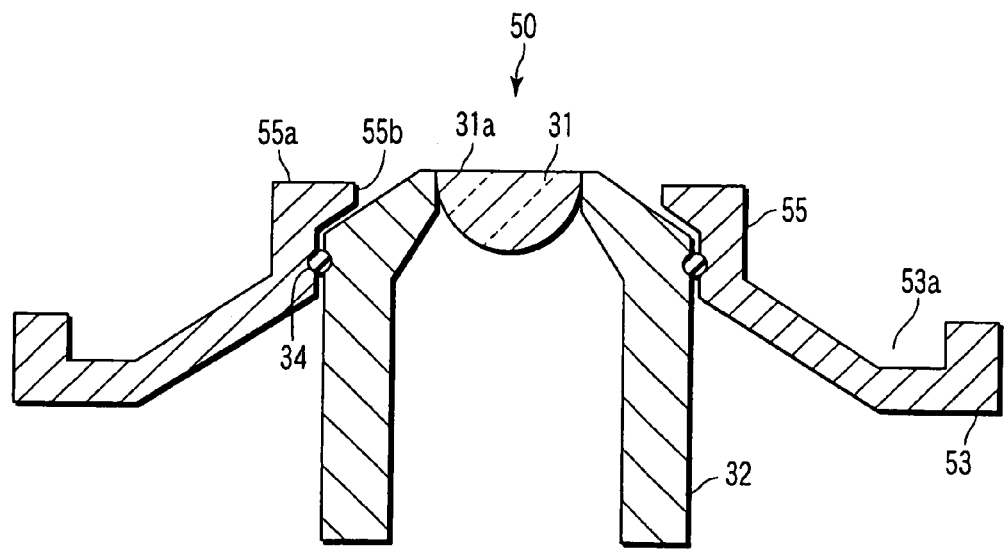
FIG. 7 shows a longitudinal section of an immersion objective lens according to the second embodiment of the present invention.

This embodiment is directed to another immersion objective lens that can replace the immersion objective lens of the first embodiment. FIG. 7 shows a longitudinal sectional view of an immersion objective lens according to the second embodiment of the present invention. In FIG. 7, members that are denoted by the same reference numerals as those of the members shown in FIG. 1 are identical members, and a detailed description thereof will be omitted.

As shown in FIG. 7, an immersion objective lens 50 according to this embodiment has a front lens 31, a lens frame 32 which supports the front lens 31, and a liquid preventive frame 53 which is attached around the lens frame 32. Namely, the immersion objective lens 50 has the liquid preventive frame 53 in place of the liquid preventive frame 33 of FIG. 1. The liquid preventive frame 53 has a liquid bulb holding wall 55 on its inner side (a side closer to the center axis of the lens) and a liquid receiving portion 53a on its outer side.

A distal end 55a of the liquid bulb holding wall 55 is located more inner in the immersion objective lens 50 in a direction parallel to the center axis of the front lens 31 than a distal end face 31a of the front lens 31. In other words, the distal end 55a of the liquid bulb holding wall 55 is located behind the distal end face 31a of the front lens 31 along the center axis of the front lens 31. More specifically, when the immersion objective lens 50 is set so that the front lens 31 comes to the upper side and the center axis of the front lens 31 extends in the vertical direction, the distal end 55a of the liquid bulb holding wall 55 is at a position lower than the distal end face 31a of the front lens 31.

Furthermore, a side surface 55b on the inner side of the liquid bulb holding wall 55 is located on the outer side of the outermost circumference of the front lens 31 and on the inner side of the outermost circumference of the lens frame 32. Namely, the inner diameter of the side surface 55b is larger than the diameter of the front lens 31 and smaller than the diameter of the outermost circumference of the lens frame 32.

The volume of a liquid bulb formed by supplying the liquid inside the liquid bulb holding wall 55 is smaller than that of, e.g., a liquid bulb formed by supplying the liquid inside the liquid bulb holding wall 35 the side surface 35b of which is located on the outer side of the outermost circumference of the lens frame 32, as shown in FIG. 3. Thus, the immersion objective lens 50 according to this embodiment can hold the liquid bulb more stably.

Third Embodiment

Figure 8:
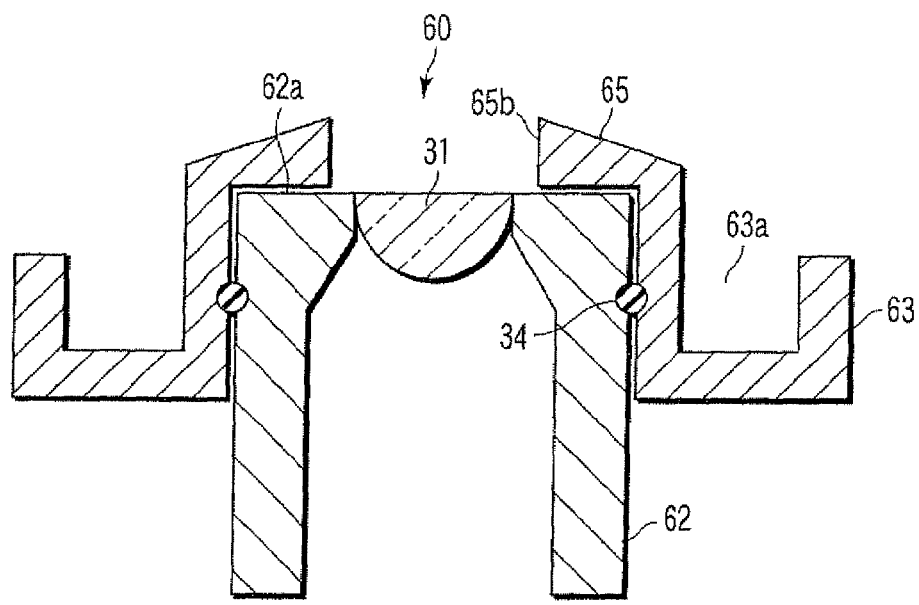
FIG. 8 shows a longitudinal section of an immersion objective lens according to the third embodiment of the present invention.

This embodiment is directed to another immersion objective lens that can replace the immersion objective lens of the first embodiment. FIG. 8 shows a longitudinal section of an immersion objective lens according to the third embodiment of the present invention.

As shown in FIG. 8, an immersion objective lens 60 according to this embodiment has a front lens 31, a lens frame 62 which supports the front lens 31, and a liquid preventive frame 63 which is attached around the lens frame 32. A distal end 62a of the lens frame 62 is perpendicular to the center axis of the front lens 31, that is, the distal end 62a forms a flat surface. The liquid preventive frame 63 has a liquid bulb holding wall 65 on its inner side (a side closer to the center axis of the lens) and a liquid receiving portion 63a on its outer side.

The liquid bulb holding wall 65 is located in front of a distal end 62a of the lens frame 62 along the center axis of the front lens 31. A side surface 65b on the inner side of the liquid bulb holding wall 65 is located on the outer side of the outermost circumference of the front lens 31 and on the inner side of the outermost circumference of the lens frame 32. In other words, the inner diameter of the side surface 65b is larger than the diameter of the front lens 31 and smaller than the diameter of the outermost circumference of the lens frame 62.

According to the immersion objective lens 60 of the present embodiment, a liquid bulb formed by supplying the liquid inside the liquid bulb holding wall 65 is stably held by the liquid bulb holding wall 65. Even when a sample plate 12 is moved in the horizontal direction, the liquid does not flow out from between the immersion objective lens 60 and sample plate 12.

Figure 9:
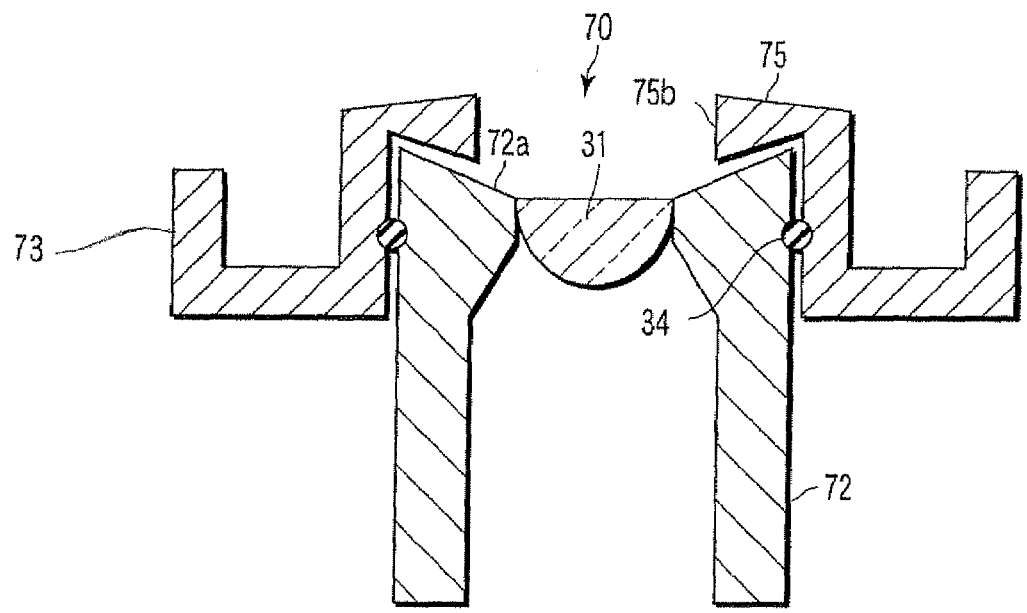
FIG. 9 shows a longitudinal section of an immersion objective lens according to a modification to an embodiment of the present invention.

FIG. 9 shows a longitudinal section of an immersion objective lens according to a modification to an embodiment of the present invention.

As shown in FIG. 9, an immersion objective lens 70 according to this modification has a front lens 31, a lens frame 72 which supports the front lens 31, and a liquid preventive wall 73 which is attached around the lens frame 72. A distal end 72a of the lens frame 72 is high on the outer side and lowers toward the front lens 31. A liquid bulb holding wall 75 is located in front of the distal end 72a of the lens frame 72 along the center axis of the front lens 31.

A side surface 75b on the inner side of the liquid bulb holding wall 75 is located on the outer side of the outermost circumference of the front lens 31 and on the inner side of the outermost circumference of the lens frame 32. In other words, the inner diameter of the side surface 75b is larger than the diameter of the front lens 31 and smaller than the diameter of the outermost circumference of the lens frame 72.

According to the immersion objective lens 70 of the present modification as well, a liquid bulb formed by supplying the liquid inside the liquid bulb holding wall 75 is stably held by the liquid bulb holding wall 75.

According to these embodiments, the liquid preventive frame 63 (or liquid preventive wall 73) is attached to the lens frame 62 (or lens frame 72) by using the O-ring 34. The liquid preventive frame 63 (or liquid preventive wall 73) can be made of a flexible, elastic, and adhesive material such as silicone rubber and be attached to the lens frame 62 (or lens frame 72) without using an O-ring. Such a liquid preventive frame can cope with lens frames having different shapes.

Fourth Embodiment

Figure 10:
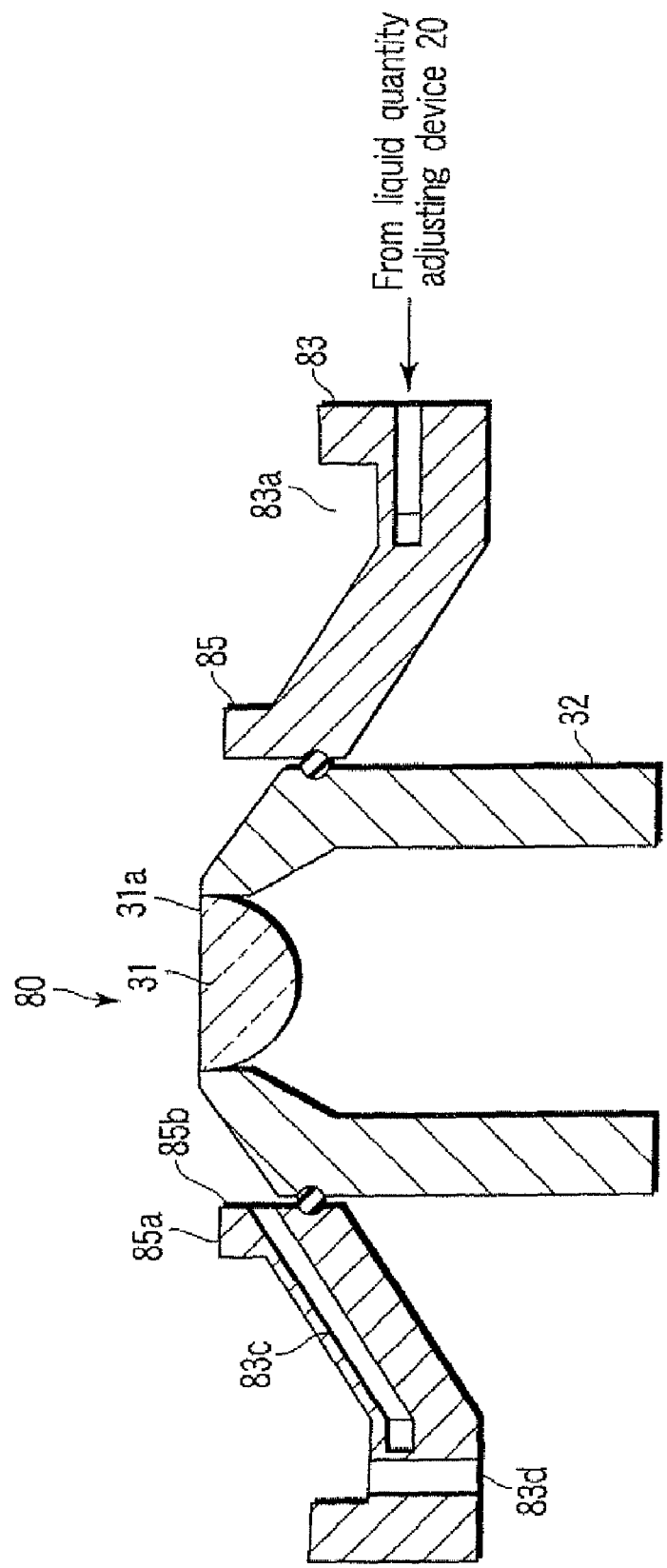
FIG. 10 shows a longitudinal section of an immersion objective lens according to the fourth embodiment of the present invention.
Figure 11:
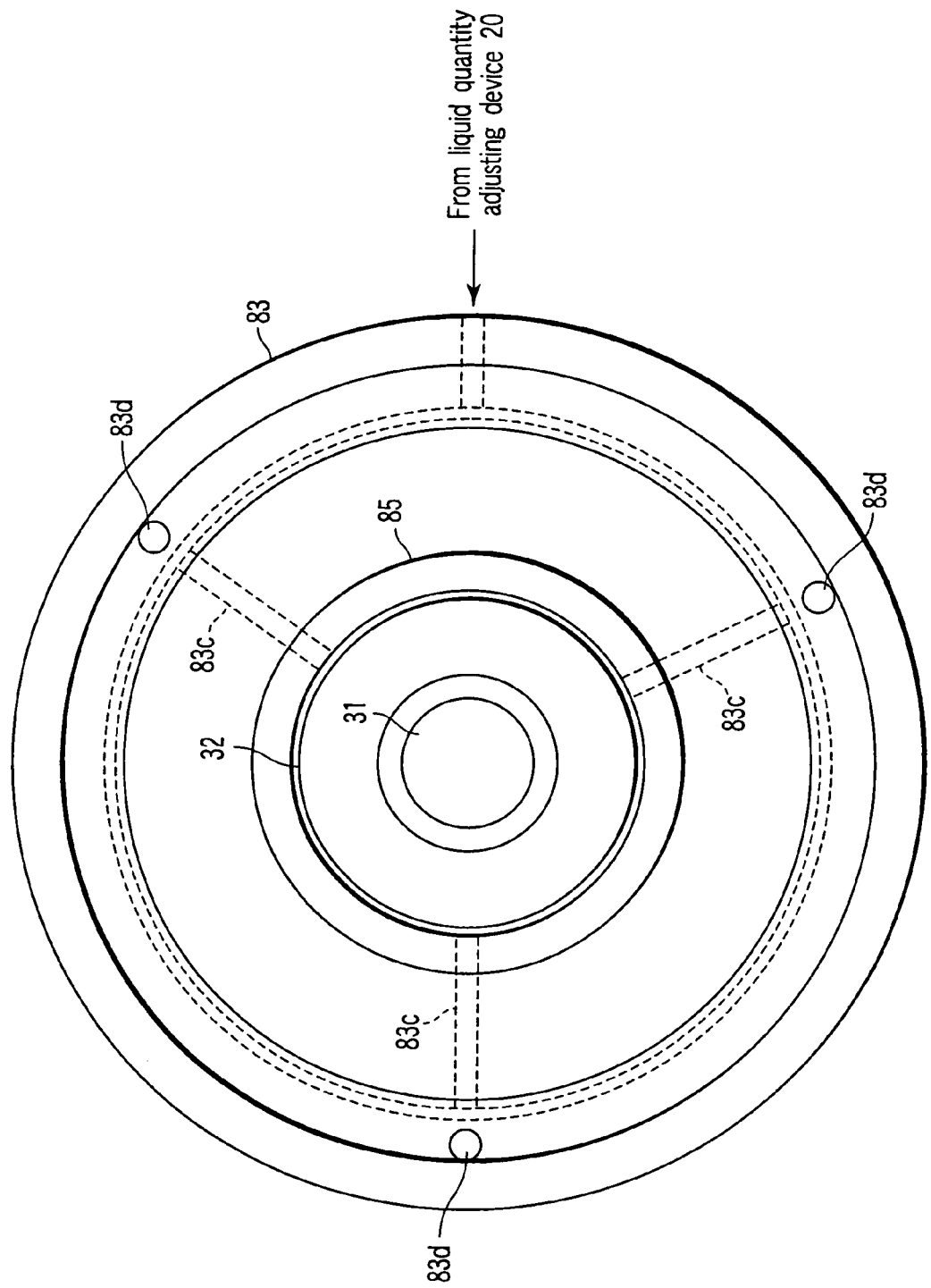
FIG. 11 is a plan view seen from above the immersion objective lens shown in FIG. 10.

This embodiment is directed to still another immersion objective lens that can replace the immersion objective lens of the first embodiment. FIG. 10 shows a longitudinal section of an immersion objective lens according to the fourth embodiment of the present invention. FIG. 11 is a plan view seen from above the immersion objective lens shown in FIG. 10.

As shown in FIG. 10, an immersion objective lens 80 according to this embodiment has a front lens 31, a lens frame 32 which supports the front lens 31, and a liquid preventive frame 83 which is attached around the lens frame 32. Namely, the immersion objective lens 80 has the liquid preventive frame 83 in place of the liquid preventive frame 33 of FIG. 1.

The liquid preventive frame 83 has a liquid bulb holding wall 85 on its inner side (a side closer to the center axis of the lens) and a liquid receiving portion 83a on its outer side. A distal end 85a of the liquid bulb holding wall 85 is located more inner in the immersion objective lens 80 in a direction parallel to the center axis of the front lens 31 than a distal end face 31a of the front lens 31 to. In other words, the distal end 85a of the liquid bulb holding wall 85 is located behind the distal end face 31a of the front lens 31 along the center axis of the front lens 31.

Liquid drain channels 83d which extend in the vertical direction are formed in the bottom of the liquid receiving portion 83a. As shown in FIG. 11, the liquid drain channels 83d are formed at three portions at an interval of 120° around the center axis of the front lens 31.

As shown in FIGS. 10 and 11, the liquid preventive frame 83 further has a liquid supply channel 83c which extends in it. The liquid supply channel 83c has a circular channel portion about the center axis of the front lens 31 as the substantial center, a portion which extends from the circular channel portion and terminates on the outer surface of the liquid preventive frame 83, and portions which extend from the circular channel portion and terminate on a side surface 85b on the inner side of the liquid bulb holding wall 85. Those portions which terminate on the side surface 85b on the inner side are formed at three locations at an interval of 120° around the center axis of the front lens 31, as shown in FIG. 11.

In the immersion objective lens 80 according to this embodiment, the liquid supply channel 83c is connected to the liquid quantity adjusting device 20 (see FIG. 2) through an open end in the outer surface of the liquid preventive frame 83. The liquid supplied from the liquid quantity adjusting device 20 flows inside the liquid bulb holding wall 85 through the liquid supply channel 83c. The liquid flowing inside the liquid bulb holding wall 85 forms a liquid bulb. The formed liquid bulb is stably held by the liquid bulb holding wall 85.

The liquid drain channels 83d are connected to a waste pipe (not shown). The liquid overflowing from the liquid bulb holding wall 85 runs through the liquid drain channels 83d and the waste pipe and is discharged outside.

According to this embodiment, in addition to the advantages described in the first embodiment, the following advantages can be obtained. As the liquid is supplied from inside the liquid bulb holding wall 85, the liquid bulb can be formed stably. As the liquid drain channels 83d extend in a direction perpendicular to the bottom of the liquid receiving portion 83a, the liquid does not overflow from the liquid receiving portion 83a but can be readily discharged well.

This embodiment may be modified in various manners. For example, the liquid drain channels 83d can be formed to extend through the outer wall of the liquid receiving portion 83a horizontally. A pump for discharging the liquid can be connected to the liquid drain channels 83d to discharge the liquid flowing into the liquid receiving portion 83a outside.

The number of open ends of the liquid supply channel 83c formed in the side surface 85b inside the liquid bulb holding wall 85 can be one. Preferably, the liquid supply channel 83c has a plurality of open ends. In this case, the liquid bulb can be formed more stably.

Although the embodiments of the present invention have been described so far with reference to the accompanying drawings, the present invention is not limited to these embodiments. Various changes and modifications may be made without departing from the scope of the present invention.

The embodiments described above exemplify immersion objective lenses which are assumed to be employed in a fluorometric analyzer. However, the immersion objective lenses of the respective embodiments can be employed in another device such as a fluorescence microscope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An immersion objective lens for an inverted microscope, the immersion objective lens comprising:
    a front lens;
    a lens frame which supports the front lens, the lens frame including a curved surface surrounding the front lens; and
    a liquid preventive frame which is attached around the lens frame, the liquid preventive frame including a liquid bulb holding wall which holds a liquid supplied onto the front lens, a distal end of the liquid bulb holding wall being located behind a distal end face of the front lens along a center axis of the front lens, and a liquid supplied channel which extends through an interior of the liquid preventive frame, the liquid supplied channel having an inner opening which is open to an inner side of the liquid bulb holding wall and an outer opening which is open to an outer side of the liquid preventive frame, wherein liquid is supplied from the inner opening through the liquid supplied channel from the outer opening which is connected to an external liquid supply device;
    wherein the liquid preventive frame includes a liquid receiving portion which receives the liquid that has moved from inside to outside the liquid bulb holding wall, and the liquid receiving portion includes a liquid drain channel which discharges the liquid outside the liquid preventive frame.

2. An immersion objective lens according to claim 1, wherein a side surface on an inner side of the liquid bulb holding wall is parallel to a vertical direction.

3. An immersion objective lens according to claim 1, wherein the distal end of the liquid bulb holding wall is located in front of an outer circumference of the curved surface of the lens frame, so that an inner side surface of the liquid bulb holding wall and the curved surface of the lens frame form a recess.

4. An immersion objective lens according to claim 3, wherein the inner side surface of the liquid bulb holding wall is parallel to the center axis of the front lens.

5. An optical analyzer comprising:
    a light source to irradiate a sample with light;
    an inverted microscope, the inverted microscope including an immersion objective lens and a liquid supply device which supplies a liquid onto the immersion objective lens, the immersion objective lens including a front lens, a lens frame which supports the front lens, and a liquid preventive frame which is attached around the lens frame, the lens frame including a curved surface surrounding the front lens, the liquid preventive frame including a liquid bulb holding wall which holds the liquid supplied onto the front lens, a distal end of the liquid bulb holding wall being located behind a distal end face of the front lens along a center axis of the front lens, and a liquid supplied channel which extends through an interior of the liquid preventive frame, the liquid supplied channel having an inner opening which is open to an inner side of the liquid bulb holding wall and an outer opening which is open to an outer side of the liquid preventive frame, wherein liquid is supplied from the inner opening through the liquid supplied channel from the outer opening which is connected to an external liquid supply device, the liquid preventive frame includes a liquid receiving portion which receives the liquid that has moved from inside to outside the liquid bulb holding wall, and the liquid receiving portion includes a liquid drain channel which discharges the liquid outside the liquid preventive frame;
    a photoelectrical signal converter which converts light obtained by the inverted microscope into an electrical signal; and
    a data processor which obtains various types of characteristics of the sample on the basis of the electrical signal which has been converted by the photoelectrical signal converter.

6. An optical analyzer according to claim 5, wherein the optical analyzer further comprises a controller which controls operation of the optical analyzer and, after the liquid is supplied onto the front lens, the controller moves the immersion objective lens closer to a container which contains a sample.

7. An optical analyzer according to claim 5, wherein the distal end of the liquid bulb holding wall is located in front of an outer circumference of the curved surface of the lens frame, so that an inner side surface of the liquid bulb holding wall and the curved surface of the lens frame form a recess.

8. An optical analyzer according to claim 7, wherein the inner side surface of the liquid bulb holding wall is parallel to the center axis of the front lens.

9. An inverted microscope comprising:
    an immersion objective lens, the immersion objective lens including a front lens, a lens frame which supports the front lens, and a liquid preventive frame which is attached around the lens frame the lens frame including a curved surface surrounding the front lens, the liquid preventive frame including a liquid bulb holding wall which holds the liquid supplied onto the front lens, a distal end of the liquid bulb holding wall being located behind a distal end face of the front lens along a center axis of the front lens, and a liquid supplied channel which extends through an interior of the liquid preventive frame, the liquid supplied channel having an inner opening which is open to an inner side of the liquid bulb holding wall and an outer opening which is open to an outer side of the liquid preventive frame; and
    a liquid supply device which is connected to the outer opening of the liquid supplied channel and supplies a liquid onto the immersion objective lens from the inner opening through the liquid supplied channel,
    wherein the liquid preventive frame includes a liquid receiving portion which receives the liquid that has moved from inside to outside the liquid bulb holding wall, and the liquid receiving portion includes a liquid drain channel which discharges the liquid outside the liquid preventive frame.

10. An inverted microscope according to claim 9, wherein the distal end of the liquid bulb holding wall is located in front of an outer circumference of the curved surface of the lens frame, so that an inner side surface of the liquid bulb holding wall and the curved surface of the lens frame form a recess.

11. An inverted microscope according to claim 10, wherein the inner side surface of the liquid bulb holding wall is parallel to the center axis of the front lens.

* * * * *